(12) United States Patent
Uehara

(10) Patent No.: US 10,436,283 B2
(45) Date of Patent: Oct. 8, 2019

(54) DYNAMIC VIBRATION ABSORBING DEVICE

(71) Applicant: EXEDY Corporation, Neyagawa-shi, Osaka (JP)

(72) Inventor: Hiroshi Uehara, Neyagawa (JP)

(73) Assignee: EXEDY CORPORATION, Neyagawa-Shi, Osaka (JP)

( * ) Notice: Subject to any disclaimer, the term of this patent is extended or adjusted under 35 U.S.C. 154(b) by 0 days.

(21) Appl. No.: 15/585,606

(22) Filed: May 3, 2017

(65) Prior Publication Data

US 2017/0356523 A1 Dec. 14, 2017

(30) Foreign Application Priority Data

Jun. 8, 2016 (JP) .................................. 2016-114768

(51) Int. Cl.
*F16F 15/14* (2006.01)
*F16F 15/12* (2006.01)
*F16F 15/123* (2006.01)

(52) U.S. Cl.
CPC ...... *F16F 15/1421* (2013.01); *F16F 15/1202* (2013.01); *F16F 15/12326* (2013.01); *F16F 15/12353* (2013.01); *F16F 15/12366* (2013.01); *F16F 2222/08* (2013.01); *F16F 2232/02* (2013.01)

(58) Field of Classification Search
CPC ............. F16F 15/1202; F16F 15/12326; F16F 15/12353; F16F 15/139; F16F 15/1421
See application file for complete search history.

(56) References Cited

U.S. PATENT DOCUMENTS

| | | | | |
|---|---|---|---|---|
| 4,739,866 A | * | 4/1988 | Reik | ...................... F16F 15/131 192/103 R |
| 8,424,659 B2 | * | 4/2013 | Otanez | ................ F16F 15/1421 188/378 |

FOREIGN PATENT DOCUMENTS

| | | | | |
|---|---|---|---|---|
| DE | 102013212272 A1 | * | 2/2014 | ............ F16F 15/145 |
| JP | 2015017671 A | | 1/2015 | |

* cited by examiner

*Primary Examiner* — Thomas C Diaz
(74) *Attorney, Agent, or Firm* — United IP Counselors, LLC

(57) ABSTRACT

A dynamic damper device for absorbing a torsional vibration includes a rotary part, an inertia part, and an elastic part. The rotary part is a part to which the torsional vibration is transmitted, and is rotatable about a rotational center. The inertia part is provided on the rotary part so as to be movable in a radial direction with respect to the rotary part by a centrifugal force and be movable in a circumferential direction with respect to the rotary part by the torsional vibration. The elastic part couples the rotary part and the inertia part.

6 Claims, 9 Drawing Sheets

DYNAMIC VIBRATION ABSORBING DEVICE

CROSS-REFERENCE TO RELATED APPLICATIONS

This application claims priority to Japanese Patent Application No. 2016-114768 filed on Jun. 8, 2016, the entirety of which is hereby incorporated by reference in its entirety.

BACKGROUND

Technical Field

The present disclosure relates to a dynamic vibration absorbing device, particularly to a dynamic vibration absorbing device that absorbs torsional vibration.

Background Information

A well-known dynamic vibration absorbing device, such as a dynamic damper, includes a rotary part (a damper plate 52), an inertia part (a pair of inertia rings 53 and a pair of lid members 54) and an elastic part (coil springs 55) (see Japan Laid-open Patent Application Publication No. 2015-17671). In this dynamic damper, the inertia part is moved in a circumferential direction through the elastic part when torsional vibration is transmitted to the rotary part. The torsional vibration is absorbed by the movement of the inertial part.

In the well-known dynamic vibration absorbing device, the inertia part is moved in the circumferential direction so as to absorb the torsional vibration transmitted to the rotary part. In the dynamic vibration absorbing device, the inertia part is moved in the circumferential direction, while distance between the inertial part and a rotational center is kept constant.

When the mass of the inertia part and the stiffness of the elastic part are herein assumed to be constant, the inertia part is effectively actuated at a predetermined rotational velocity, that is, a resonant rotational velocity. Put differently, the well-known dynamic vibration absorbing device effectively absorbs torsional vibration at a single resonant rotational velocity corresponding to the (constant) mass of the inertial part and the (constant) stiffness of the elastic part. Therefore, the well-known dynamic vibration absorbing device has a drawback that the effect of absorbing torsional vibration degrades when the rotational velocity of the rotary part deviates from the resonant rotational velocity.

BRIEF SUMMARY

The present disclosure is made in view of the aforementioned drawback, and it is an object of the present disclosure to provide a dynamic vibration absorbing device capable of absorbing torsional vibration preferably and appropriately.

(1) A dynamic vibration absorbing device according to an aspect of the present disclosure is provided for absorbing a torsional vibration. The present dynamic vibration absorbing device includes a rotary part, an inertia part and an elastic part. The rotary part is a part to which the torsional vibration is transmitted. The rotary part is configured to be rotatable about a rotational center. The inertia part is provided on the rotary part so as to be movable in a radial direction with respect to the rotary part by a centrifugal force and be movable in a circumferential direction with respect to the rotary part by the torsional vibration. The elastic part couples the rotary part and the inertia part.

In the present dynamic vibration absorbing device, when a centrifugal force acts on the inertia part while the elastic part couples the inertia part and the rotary part, the inertia part is moved in the radial direction with respect to the rotary part by this centrifugal force. Then, in the radial position after the movement, the inertia part is moved in the circumferential direction with respect to the rotary part by the aforementioned torsional vibration. The aforementioned torsional vibration is absorbed by this movement of the inertia part.

In the present dynamic vibration absorbing device, when the centrifugal force (e.g., rotational velocity) changes, distance between the inertia part and the rotational center changes. Accordingly, the effective mass (virtual mass) of the inertia part changes. Then, a resonant rotational velocity changes in accordance with change in effective mass. Thus, in the present dynamic vibration absorbing device, the resonant rotational velocity can be changed in accordance with change in centrifugal force, for instance, change in rotational velocity. In other words, the torsional vibration can be absorbed preferably and appropriately in accordance with change in centrifugal force (rotational velocity).

(2) In a dynamic vibration absorbing device according to another aspect of the present disclosure, the inertia part may be engaged with the rotary part so as to be movable in the radial direction and the circumferential direction. With this configuration, the inertia part can be moved in the radial direction and the circumferential direction without preparing any special component.

(3) In a dynamic vibration absorbing device according to another aspect of the present disclosure, the rotary part may include a placement part. The placement part is provided as a part in which the inertia part is disposed to be movable in the radial direction and the circumferential direction. With this configuration, the inertia part can be moved in the radial direction and the circumferential direction without preparing any special component.

(4) In a dynamic vibration absorbing device according to another aspect of the present disclosure, the placement part may include a first contacted part and a second contacted part. The first contacted part is a part with which a radially inner part of the inertia part makes contact. The second contacted part is a part with which a radially outer part of the inertia part makes contact.

In this case, for instance, when the centrifugal force is smaller than a first predetermined value, including when the centrifugal force is not applied and when the centrifugal force is small (when the centrifugal force is smaller than the mass of the inertia part), the radially inner part of the inertia part makes contact with the first contacted part. When a friction force between the inertia part and the first contacted part is herein larger than a circumferential force acting on the inertia part, the inertia part is immovable in the circumferential direction.

Then, when the centrifugal force gradually increases and reaches a second predetermined value, the radially outer part of the inertia part makes contact with the second contacted part. When a friction force between the inertia part and the second contacted part is herein larger than the circumferential force acting on the inertia part, the inertia part is immovable in the circumferential direction.

Accordingly, the inertia part can be circumferentially moved by torsional vibration in a range of centrifugal force that is greater than or equal to the first predetermined value and is less than the second predetermined value, for instance, in a predetermined range of rotational velocity. Thus, in the present dynamic vibration absorbing device, torsional vibration can be absorbed preferably and appropriately in a range of rotational velocity that is desired by a designer.

(5) A dynamic vibration absorbing device according to another aspect of the present disclosure may further include a positioning structure. The positioning structure positions the inertia part in the circumferential direction with respect to the rotary part. The positioning structure includes a first positioning part and a second positioning part. The first positioning part is included in the first contacted part. The second positioning part is included in the radially inner part, and is engaged with the first positioning part. With this configuration, the inertia part can be stably positioned with respect to the rotary part.

(6) In a dynamic vibration absorbing device according to another aspect of the present disclosure, the elastic part may be deformable by movement of the inertia part in the radial direction, and may be deformable by movement of the inertia part in the circumferential direction.

In this case, when the inertia part is radially moved by the centrifugal force, the elastic part is radially deformed. In accordance with the change in shape of the elastic part, the stiffness of the elastic part (hereinafter referred to as shear stiffness) in a direction intersecting with the radial direction also changes. Accordingly, the resonant rotational velocity of the dynamic vibration absorbing device changes. In this state, when the inertia part is circumferentially moved through the elastic part with respect to the rotary part, torsional vibration is absorbed.

Thus, in the present dynamic vibration absorbing device, the resonant rotational velocity can be changed in accordance with change in centrifugal force, for instance, change in rotational velocity. In other words, torsional vibration can be absorbed preferably and appropriately in accordance with change in centrifugal force (rotational velocity).

(7) In a dynamic vibration absorbing device according to another aspect of the present disclosure, the elastic part may be a coil spring. In this case, one end of the coil spring is supported by the rotary part, and the other end of the coil spring is supported by the inertia part.

In this configuration, when the inertia part is radially moved by the centrifugal force, the coil spring is axially compressed and deformed, and the shear stiffness thereof changes. In this state, when the inertia part is circumferentially moved through the coil spring with respect to the rotary part, torsional vibration is absorbed.

Thus, in the present dynamic vibration absorbing device, the resonant rotational velocity can be changed in accordance with change in centrifugal force, for instance, change in rotational velocity. In other words, torsional vibration can be absorbed preferably and appropriately in accordance with change in centrifugal force (rotational velocity).

(8) In a dynamic vibration absorbing device according to another aspect of the present disclosure, the elastic part may be a coil spring having inconstant winding intervals.

In this case, at least part of intervals between windings of the coil spring is set to be inconstant. Accordingly, the resonant rotational velocity can be changed preferably and appropriately in accordance with change in centrifugal force, for instance, change in rotational velocity.

Overall, according to the present disclosure, the dynamic vibration absorbing device can absorb torsional vibration preferably and appropriately.

BRIEF DESCRIPTION OF THE DRAWINGS

Referring now to the attached drawings which form a part of this original disclosure.

DETAILED DESCRIPTION OF EMBODIMENTS

Figure 1:
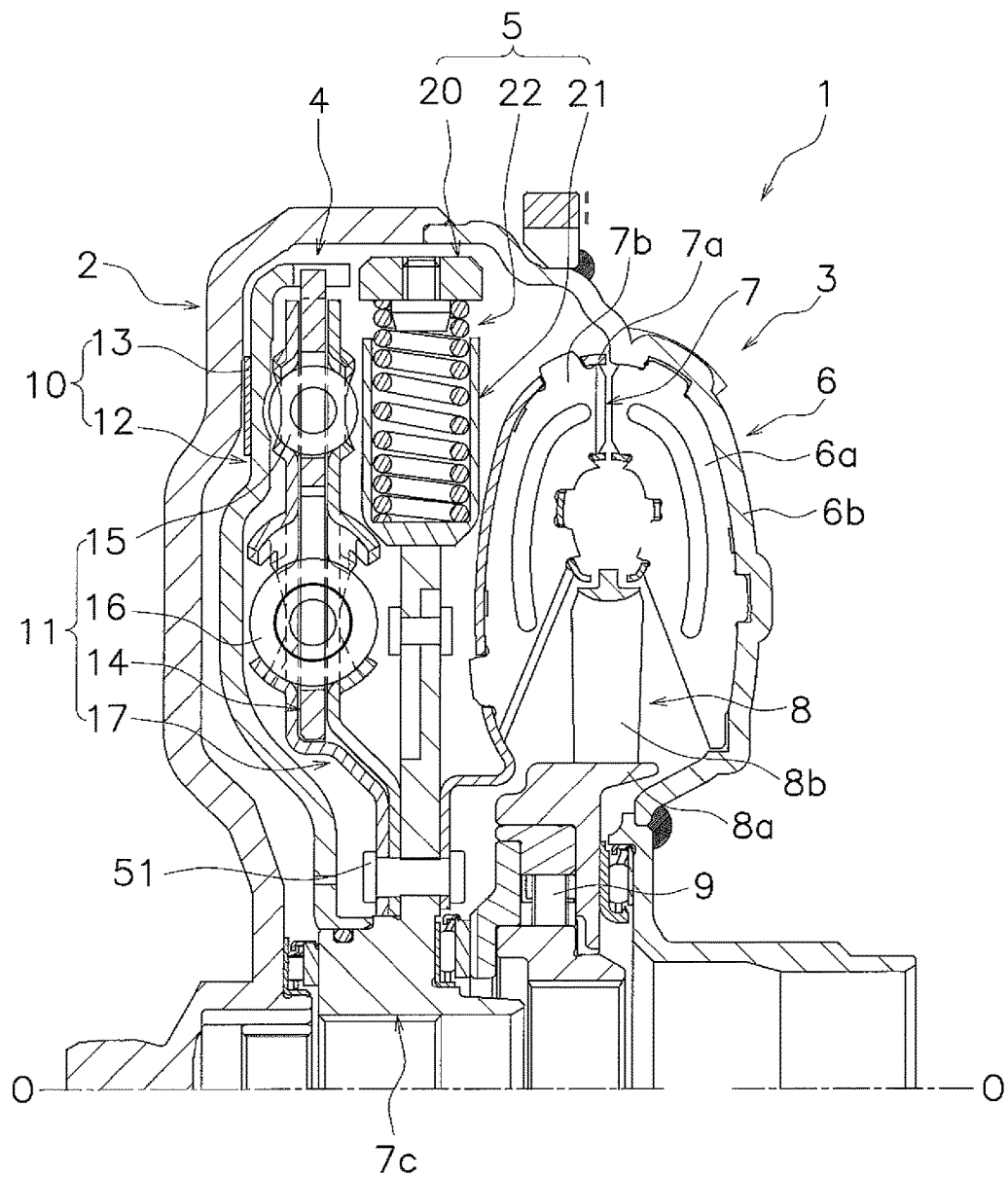
FIG. 1 is a cross-sectional configuration diagram of a torque converter including a lock-up device according to a preferred embodiment of the present disclosure.

FIG. 1 is a partial cross-sectional view of a torque converter 1 including a dynamic damper device 5 according to a preferred embodiment of the present disclosure. In FIG. 1, an engine (not shown in the drawing) is disposed on the left side whereas a transmission (not shown in the drawing) is disposed on the right side. It should be noted that line O-O depicted in FIG. 1 is a rotational center of the torque converter 1. It should be also noted that in the following explanation, a direction separating from the rotational center O may be referred to as "radial direction"; a direction along the rotational center O may be referred to as "axial direction"; and a direction about the rotational center O may be referred to as "circumferential direction".

[Entire Configuration of Torque Converter]

The torque converter 1 is a device that transmits a torque from an engine-side crankshaft (not shown in the drawings) to an input shaft of the transmission. As shown in FIG. 1, the torque converter 1 is composed of a front cover 2, a torque converter body 3, a lock-up device 4 and the dynamic damper device 5 (exemplary dynamic vibration absorbing device).

The front cover 2 is fixed to an input-side member. The front cover 2 is a substantially disc-shaped member and includes an outer peripheral tubular part 2a, protruding toward the transmission, in the outer peripheral part thereof.

The torque converter body 3 is composed of three types of bladed wheels, for instance, an impeller 6, a turbine 7 and a stator 8.

The impeller 6 is composed of an impeller shell 6a, a plurality of impeller blades 6b and an impeller hub 6c. The impeller shell 6a is fixed to the outer peripheral part 2a of the front cover 2 by welding. The impeller blades 6b are fixed to the inside of the impeller shell 6a. The impeller hub 6c has a tubular shape and is provided on the inner peripheral side of the impeller shell 6a.

The turbine 7 is disposed axially in opposition to the impeller 6 within a fluid chamber. The turbine 7 is composed of a turbine shell 7a, a plurality of turbine blades 7b and a turbine hub 7c. The turbine blades 7b are fixed to the turbine shell 7a. The turbine hub 7c is fixed to the inner peripheral side of the turbine shell 7a. The turbine hub 7c includes a flange 7d extending radially outside. The inner peripheral part of the turbine shell 7a is fixed to the flange 7d by fixation means, for instance, a plurality of rivets 51. Additionally, the input shaft (not shown in the drawings) of the transmission is spline-coupled to the inner peripheral part of the turbine hub 7c.

The stator 8 regulates the flow of hydraulic oil returning from the turbine 7 to the impeller 6. The stator 8 is disposed axially between the impeller 6 and the turbine 7 in the inner peripheral part of the impeller 6 and that of the turbine 7. The stator 8 is mainly composed of a stator carrier 8a and a plurality of stator blades 8b provided on the outer peripheral surface of the stator carrier 8a. The stator carrier 8a is supported by a stationary shaft through a one-way clutch 9.

[Lock-up Device]

As shown in FIG. 1, the lock-up device 4 is disposed axially between the front cover 2 and the turbine 7 in a space between the front cover 2 and the turbine 7. The lock-up device 4 includes a clutch part 10 and a damper part 11.

<Clutch Part>

Figure 2:
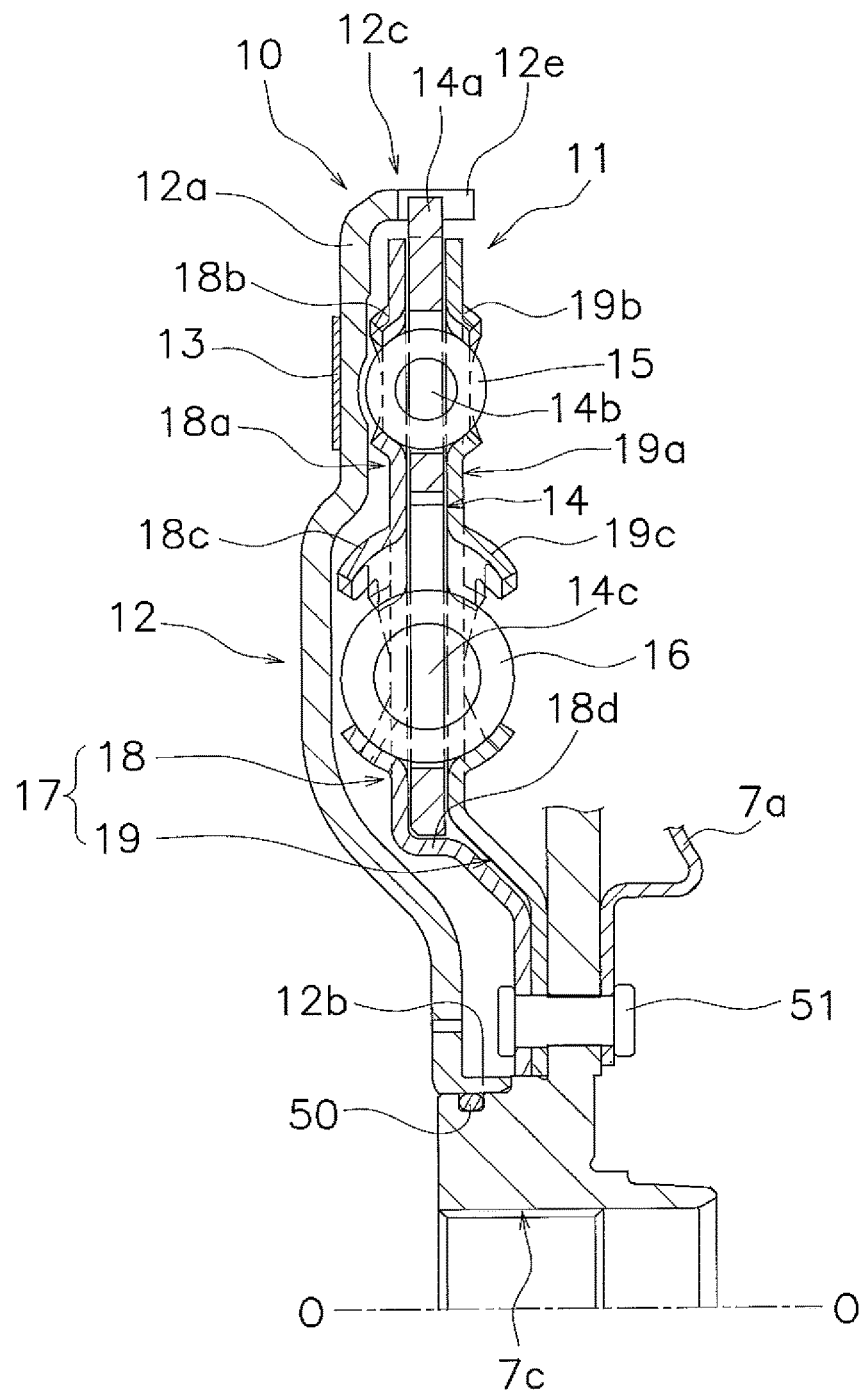
FIG. 2 is a diagram of the lock-up device extracted from the torque converter in FIG. 1.

As shown in FIGS. 1 and 2, the clutch part 10 includes a piston 12 and a friction facing 13.

The piston 12 has a substantially annular shape. The piston 12 is disposed axially between the front cover 2 and the damper part 11.

The piston 12 is configured to be axially movable with respect to the damper part 11.

Additionally, the piston 12 is configured to be rotatable unitarily with a drive plate 14 (to be described) of the damper part 11.

The piston 12 includes a pressing part 12a, an inner peripheral annular part 12b and an outer peripheral annular part 12c. The pressing part 12a is provided to press the friction facing 13 onto the front cover 2. The pressing part 12a is included in the outer peripheral part of the piston 12. In more detail, the pressing part 12a is included in the outer peripheral part of the piston 12 so as to be axially opposed to the front cover 2.

The inner peripheral annular part 12b is included in the inner peripheral part of the piston 12. The inner peripheral annular part 12b has a substantially annular shape. The inner peripheral annular part 12b is supported by the outer peripheral part of the turbine hub 7c so as to be axially movable. A seal member 50 is disposed between the inner peripheral annular part 12b and the turbine hub 7c.

The outer peripheral annular part 12c is included in the outer peripheral part of the piston 12. The outer peripheral annular part 12c axially extends on the outer peripheral side of the pressing part 12a. The outer peripheral annular part 12c includes a plurality of engaging recesses 12e.

The plural engaging recesses 12e are configured to be capable of being engaged with the damper part 11. For example, the plural engaging recesses 12 are provided on the outer peripheral annular part 12c while being circumferentially aligned at predetermined intervals. Each of the plural engaging recesses 12e is axially recessed on the outer peripheral annular part 12c. A plurality of engaging protrusions 14a (to be described) of the drive plate 14 in the damper part 11 are engaged with the plural engaging recesses 12e, respectively. For example, each engaging recess 12e is fitted onto each engaging protrusion 14a so as to be axially movable with respect to each engaging protrusion 14a.

The friction facing 13 is attached to the piston 12. The friction facing 13 is pressed onto the front cover 2 by the piston 12, for instance, the pressing part 12a. Accordingly, a torque is transmitted from the front cover 2 to the damper part 11 through the piston 12.

<Damper Part>

The damper part 11 transmits a torque inputted from the front cover 2, and attenuates torsional vibration inputted from the front cover 2.

As shown in FIGS. 1 and 2, the damper part 11 includes the drive plate 14, a plurality of outer peripheral side coil springs 15, a plurality of inner peripheral side coil springs 16 and a driven plate 17.

—Drive Plate—

The drive plate 14 is a substantially annular and disc-shaped member. As shown in FIG. 2, the drive plate 14 is configured to be rotatable with respect to the driven plate 17. For example, the drive plate 14 is supported to be rotatable with respect to the driven plate 17.

Additionally, the drive plate 14 is configured to be unitarily rotatable with the piston 12. For example, the drive plate 14 is engaged with the outer peripheral annular part 12c of the piston 12 so as to be unitarily rotatable with the piston 12.

Specifically, the drive plate 14 includes the plurality of engaging protrusions 14a, a plurality of (e.g., four) first window parts 14b and a plurality of (e.g., four) second window parts 14c.

The plural engaging protrusions 14a are configured to be capable of being engaged with the piston 12. The plural engaging protrusions 14a are provided on the outer peripheral part of the drive plate 14. For example, the plural engaging protrusions 14a protrude radially outward from the outer peripheral part of the drive plate 14. The plural engaging protrusions 14a are provided on the outer peripheral part of the drive plate 14 while being circumferentially aligned at predetermined intervals.

Each engaging protrusion 14a is disposed in the interior of each engaging recess 12e of the piston 12. In this condition, each engaging protrusion 14a supports each engaging recess 12e so as to make each engaging recess 12e axially movable. Additionally, each engaging protrusion 14a is fitted to each engaging recess 12e so as to be rotatable unitarily with each engaging recess 12e.

The plural first window parts 14b are included in the outer peripheral part of the drive plate 14. Specifically, the plural first window parts 14b are included in drive plate 14 while being circumferentially aligned at predetermined intervals. The plural outer peripheral side coil springs 15 are disposed in the plural first window parts 14b, respectively.

The plural second window parts 14c are included in the inner peripheral part of the drive plate 14. Specifically, the plural second window parts 14c are included in the drive plate 14 while being circumferentially aligned at predetermined intervals on the radially inner peripheral side of the plural first window parts 14b. The plural inner peripheral side coil springs 16 are disposed in the plural second window parts 14c, respectively.

—Driven Plate—

As shown in FIG. 2, the driven plate 17 is configured to be rotatable with respect to the drive plate 14. The driven plate 17 is fixed to the turbine hub 7c.

The driven plate 17 includes a first driven plate 18 and a second driven plate 19. The first driven plate 18 and the second driven plate 19 are substantially annular and disc-shaped members. The first driven plate 18 is disposed on the engine side with reference to the drive plate 14. The second driven plate 19 is disposed on the transmission side with reference to the drive plate 14.

The first and second driven plates 18 and 19 are disposed axially in opposition to each other. The drive plate 14 is disposed axially between the first and second driven plates 18 and 19. The inner peripheral parts of the first and second driven plates 18 and 19 are disposed axially in adjacent to each other and are fixed to the turbine hub 7c by fixation means, for instance, the plural rivets 51.

A first body 18a and a second body 19a are disposed at a predetermined interval in the axial direction. The first body 18a extends radially outward from the inner peripheral part (a support part 18d to be described) of the first driven plate 18. The second body 19a extends radially outward from the inner peripheral part of the second driven plate 19. The drive plate 14 is disposed between these parts. In other words, the drive plate 14 is disposed axially between the first driven plate 18 and the second driven plate 19.

The first driven plate 18 includes the support part 18d that supports the inner peripheral part of the drive plate 14. Specifically, the support part 18d is included in the inner peripheral part of the first body 18a of the first driven plate 18. The support part 18d extends toward the transmission from the inner peripheral part of the first body 18a. The support part 18d has a substantially annular shape. The inner peripheral part of the drive plate 14 is disposed on the outer peripheral surface of the support part 18d. In this way, the first driven plate 18 radially positions the drive plate 14 at the support part 18d.

A plurality of third window parts 18b are provided in the outer peripheral part of the first driven plate 18 (the outer peripheral part of the first body 18a), whereas a plurality of third window parts 19b are provided in the outer peripheral part of the second driven plate 19 (the outer peripheral part of the second body 19a). For example, the plural third window parts 18b are provided in the outer peripheral part of the first body 18a while being circumferentially aligned at predetermined intervals, whereas the plural third window parts 19b are provided in the outer peripheral part of the second body 19a while being circumferentially aligned at predetermined intervals.

Each third window part 18b of the first body 18a and each third window part 19b of the second body 19a are disposed axially in opposition to each other. Additionally, each first window part 14b of the drive plate 14 is disposed axially between each third window part 18b of the first body 18a and each third window part 19b of the second body 19a. Each of the plural outer peripheral side coil springs 15 is disposed in each first window part 14b, each third window part 18b and each third window part 19b.

A plurality of fourth window parts 18c are provided in the inner peripheral part (the inner peripheral part of the first body 18a) of the first driven plate 18, whereas a plurality of fourth window parts 19c are provided in the inner peripheral part (the inner peripheral part of the second body 19a) of the second driven plate 19. For example, the plural fourth window parts 18c are provided in the inner peripheral part of the first body 18a while being circumferentially aligned at predetermined intervals, whereas the plural fourth window parts 19c are provided in the inner peripheral part of the second body 19a while being circumferentially aligned at predetermined intervals.

Each fourth window part 18c of the first body 18a and each fourth window part 19c of the second body 19a are disposed axially in opposition to each other. Additionally, each second window part 14c is disposed axially between each fourth window part 18c of the first body 18a and each fourth window part 19c of the second body 19a. Each of the plural inner peripheral side coil springs 16 is disposed in each second window part 14c, each fourth window part 18c and each fourth window part 19c.

—Outer Peripheral Side Coil Springs—

The respective plural (e.g., four) outer peripheral side coil springs 15 couple the drive plate 14 and the driven plate 17.

As shown in FIG. 2, each of the plural outer peripheral side coil springs 15 is disposed in each first window part 14b of the drive plate 14, and each third window part 18b (of the first driven plate 18) and each third window part 19b (of the second driven plate 19) of the driven plate 17.

Each outer peripheral side coil spring 15 circumferentially makes contact with each first window part 14b, each third window part 18b and each third window part 19b. In more detail, each outer peripheral side coil spring 15 makes contact with wall parts of each first window part 14b, each third window part 18b and each third window part 19b. Additionally, each outer peripheral side coil spring 15 is restricted from axially jumping out by cut-and-raised parts of each third window part 18b and each third window part 19b.

—Inner Peripheral Side Coil Springs—

The respective plural (e.g., four) inner peripheral side coil springs 16 couple the drive plate 14 and the driven plate 17.

As shown in FIG. 2, each of the plural inner peripheral side coil springs 16 is disposed in each second window part 14c of the drive plate 14, and each fourth window part 18c (of the first driven plate 18) and each fourth window part 19c (of the second driven plate 19) of the driven plate 17.

Each inner peripheral side coil spring 16 makes contact with each second window part 14c, each fourth window part 18c and each fourth window part 19c in the circumferential direction. In more detail, each inner peripheral side coil spring 16 makes contact with wall parts of each second window part 14c, each fourth window part 18c and each fourth window part 19c. Additionally, each inner peripheral side coil spring 16 is restricted from axially jumping out by cut-and-raised parts of each fourth window part 18c and each fourth window part 19c.

[Dynamic Damper Device]

The dynamic damper device 5 absorbs torsional vibration to be transmitted from the front cover 2 to the lock-up device 4.

For example, when torsional vibration of the engine is transmitted from the front cover 2 to the lock-up device 4, the torsional vibration is attenuated in the lock-up device 4. Subsequently, the torsional vibration is outputted from the lock-up device 4 and is transmitted to the dynamic damper device 5. Then, the dynamic damper device 5 absorbs the torsional vibration.

It should be noted that torsional vibration to be transmitted from the lock-up device 4 to the dynamic damper device 5 may be referred to as "input vibration". It should be also noted that the term "torsional vibration" as herein used includes meaning of "fluctuations in rotational velocity".

As shown in FIG. 1, the dynamic damper device 5 is disposed between the torque converter body 3 and the lock-up device 4. The dynamic damper device 5 is fixed together with the lock-up device 4 to the turbine hub 7c.

Figure 3:
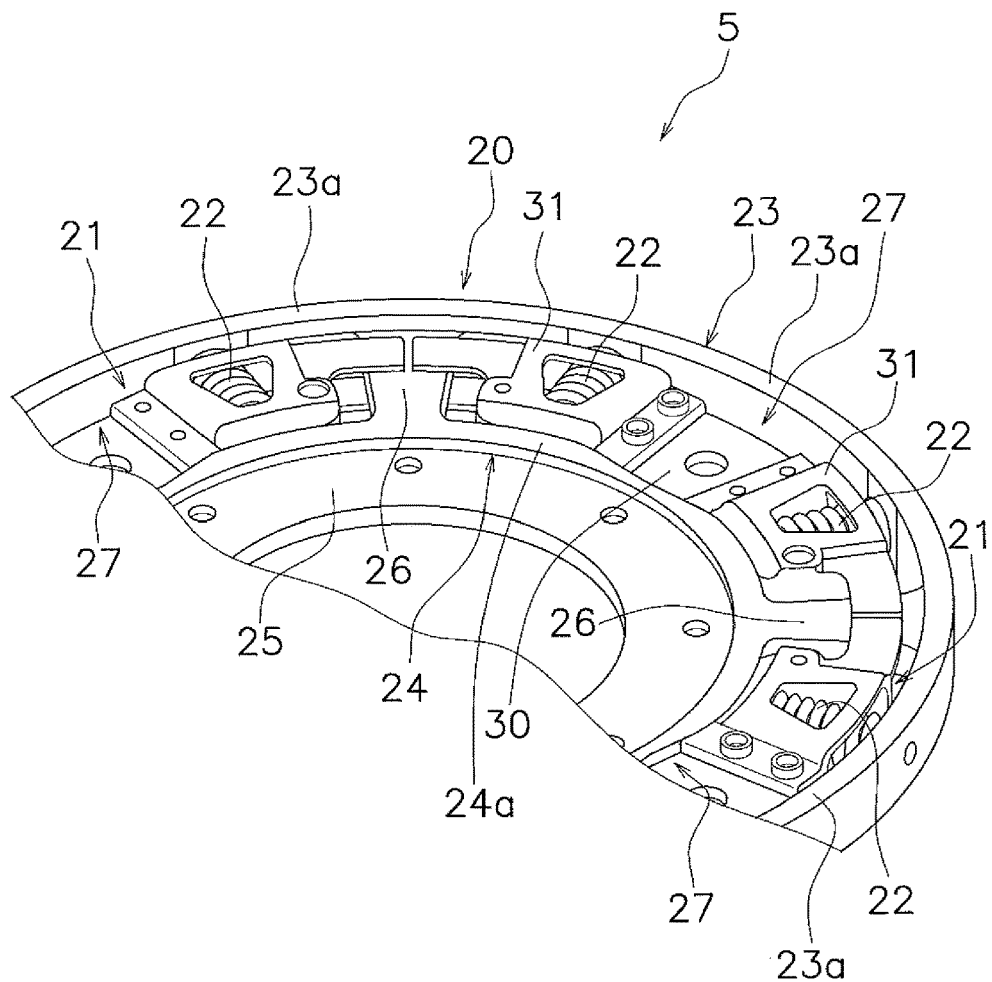
FIG. 3 is a perspective side view of a dynamic damper device.
Figure 4:
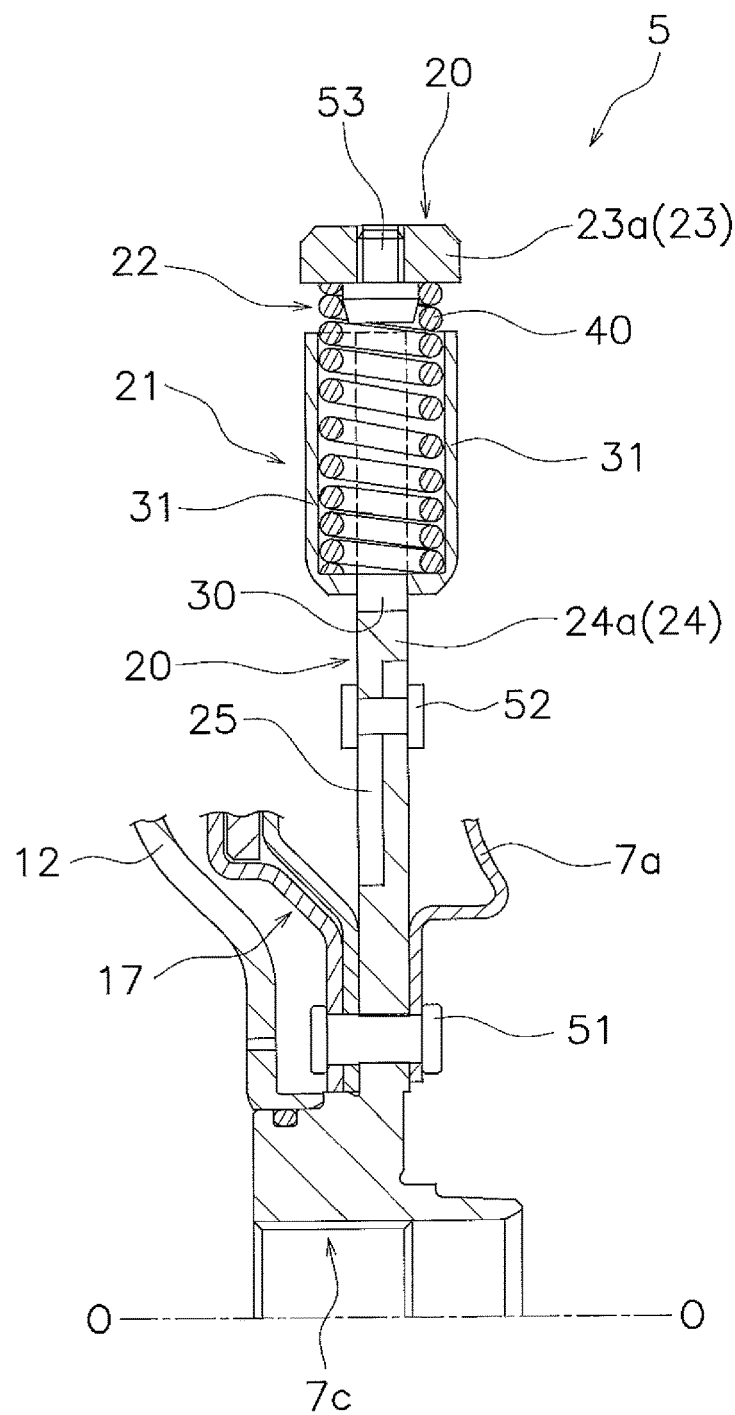
FIG. 4 is a diagram of the dynamic damper device extracted from the torque converter in FIG. 1.

As shown in FIGS. 1, 3 and 4, the dynamic damper device 5 includes a holder 20 (exemplary rotary part), a plurality of (e.g., four) inertia parts 21 (exemplary inertia part) and a plurality of (e.g., four sets of) elastic parts 22.

—Holder—

Input vibration is inputted into the holder 20 from the lock-up device 4. As shown in FIGS. 1, 3 and 4, the holder 20 is configured to be rotatable about the rotational center O. The holder 20 is fixed to the turbine hub 7c.

As shown in FIGS. 3 and 4, the holder 20 has a substantially disc shape. The holder 20 includes an outer annular part 23, an inner annular part 24, a holder attachment part 25 and a plurality of coupling parts 26.

The outer annular part 23 has a substantially annular shape. In more detail, the outer annular part 23 includes a plurality of (e.g., four) outer circular-arc parts 23a. Each outer circular-arc part 23a couples the outer peripheral parts of a pair of circumferentially adjacent coupling parts 26 in the circumferential direction.

The inner annular part 24 has a substantially annular shape. The inner annular part 24 is disposed away from the outer annular part 23 at a predetermined interval on the radially inside of the outer annular part 23. In more detail, the inner annular part 24 includes a plurality of (e.g., four) inner circular-arc parts 24a. Each inner circular-arc part 24a couples the inner peripheral parts of a pair of circumferentially adjacent coupling parts 26 in the circumferential direction. Each inner circular-arc part 24a is radially opposed to each outer circular-arc part 23a.

The holder attachment part 25 has a substantially annular shape. The holder attachment part 25 is disposed on the inner peripheral side of the inner annular part 24 and is integrated with the inner annular part 24. The holder attachment part 25 is fixed to the turbine hub 7c by fixation means such as a plurality of rivets 52.

The plural coupling parts 26 are parts that couple the inner annular part 24 and the outer annular part 23. Specifically, the plural coupling parts 26 are disposed at predetermined intervals in the circumferential direction. Each coupling part 26 extends radially toward the outer annular part 23 from the inner annular part 24, and couples the outer annular part 23 and the inner annular part 24. The outer peripheral part of each coupling part 26 is integrated with the outer annular part 23, whereas the inner peripheral part of each coupling part 26 is integrated with the inner annular part 24.

As shown in FIG. 3, the holder 20 configured as described above includes a plurality of (e.g., four) inertia placement parts 27. Each inertia part 21 is disposed in each inertia placement part 27 while being radially and circumferentially movable. Specifically, as shown in FIGS. 3 and 5, each inertia placement part 27 is a window part in which each inertia part 21 is disposed in a radially and circumferentially movable state.

Figure 5:
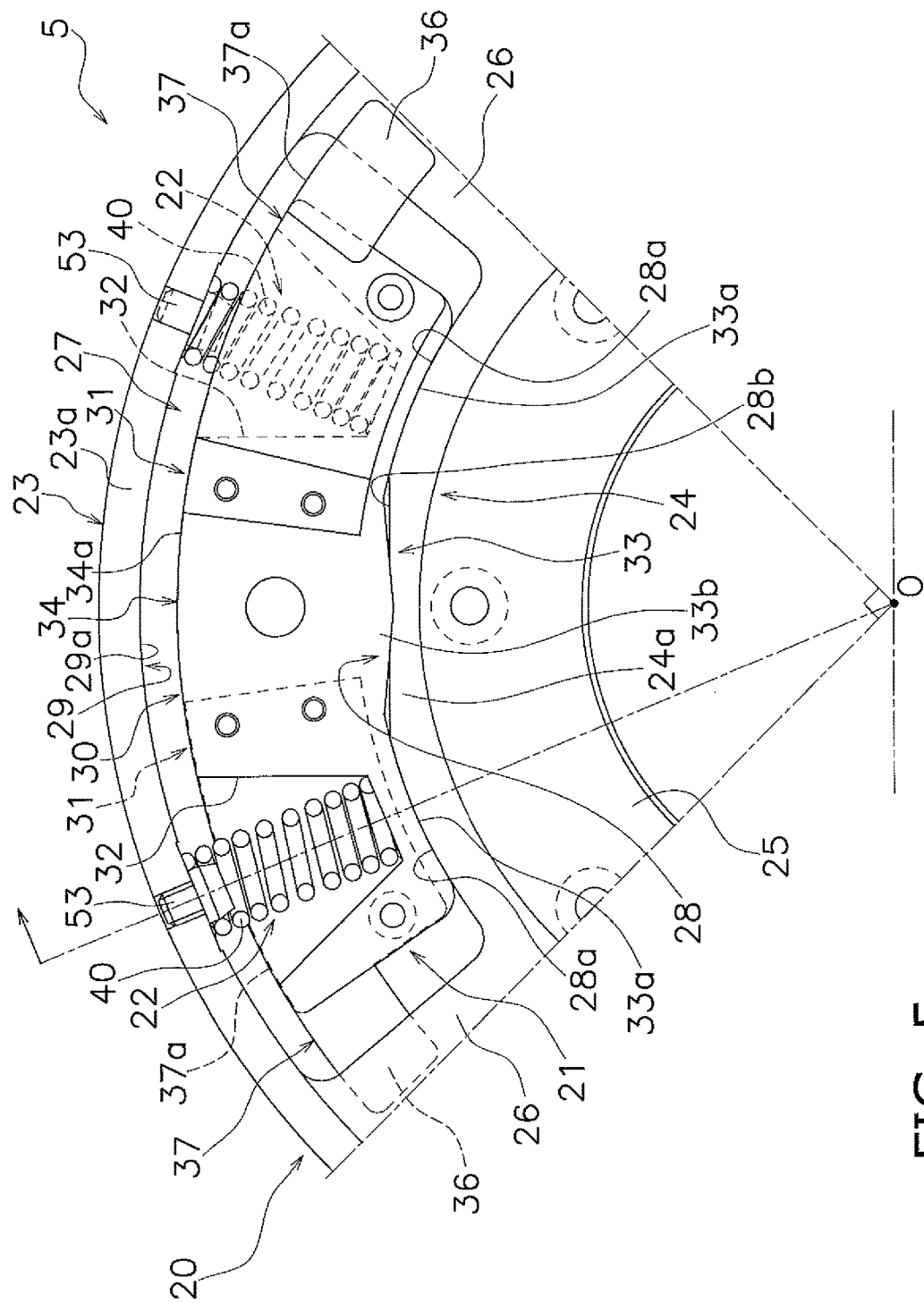
FIG. 5 is a partial side view of the dynamic damper device (a first state)

As shown in FIG. 5, each inertia placement part 27 is composed of a pair of circumferentially adjacent coupling parts 26, one outer circular-arc part 23a and one inner circular-arc part 24a. Each inertia placement part 27 includes a first contacted part 28 and a second contacted part 29.

The first contacted part 28 is configured to enable a radially inner part (a first contact part 33 to be described) of each inertia part 21 to make contact therewith. The first contacted part 28 is provided on the outer peripheral part of the inner annular part 24, for instance, the outer peripheral part of the inner circular-arc part 24a.

The first contacted part 28 includes a pair of first contacted surfaces 28a and a positioning recess 28b (exemplary first positioning part) composing a positioning structure. Each of the pair of first contacted surfaces 28a has a substantially circular-arc shape. The pair of first contacted surfaces 28a is provided at an interval in the circumferential direction.

The positioning recess 28b is provided for positioning each inertia part 21 in the circumferential direction. The positioning recess 28b is configured to be capable of being engaged with a positioning protrusion 33b (to be described) of each inertia part 21. The positioning recess 28b is provided circumferentially between the pair of first contacted surfaces 28a. For example, the positioning recess 28b is provided in the circumferential middle of the pair of coupling parts 26. The inner surface of the positioning recess 28b has a substantially V shape. The inner surface of the positioning recess 28b is capable of making contact with the outer surface of the positioning protrusion 33b of each inertia part 21. The tip of the positioning protrusion 33b is herein configured to be capable of making contact with part of the inner surface of the positioning recess 28b.

The second contacted part 29 is configured to enable the radially outer part (second and third contact parts 34 and 37 to be described) of each inertia part 21 to make contact therewith. The second contacted part 29 is provided on the inner peripheral part of the outer annular part 23, for instance, the inner peripheral part of each outer circular-arc part 23a. The second contacted part 29 includes a second contacted surface 29a. The second contacted surface 29a has a substantially circular-arc shape.

—Inertia Parts—

As shown in FIGS. 5 to 8, the plural inertia parts 21 are configured to be radially movable with respect to the holder 20 by centrifugal forces. Additionally, the plural inertia parts 21 are configured to be circumferentially movable with respect to the holder 20 by input vibration.

Each inertia part 21 is provided in the holder 20. Each inertia part 21 is engaged with the holder 20 while being movable radially and circumferentially. Each inertia part 21 is capable of radially making contact with the holder 20, and is restricted from radially moving by the holder 20.

For example, each inertia part 21 is disposed in each inertia placement part 27 of the holder 20. A gap is produced between each inertia part 21 and each inertia placement part 27. Each inertia part 21 is engaged with a pair of coupling parts 26 circumferentially adjacent to each other in the holder 20. Each inertia part 21 is capable of radially making contact with each inertia placement part 27 of the holder 20.

In more detail, as shown in FIG. 3, each inertia part 21 includes a first mass part 30 and a plurality of (e.g., two sets of) second mass parts 31.

—First Mass Part

As shown in FIGS. 5 to 8, the first mass part 30 has a substantially circular-arc plate shape. The first mass part 30 is disposed inside each inertia placement part 27. The aforementioned gap is produced between each first mass part 30 and each inertia placement part 27.

The first mass part 30 includes a pair of accommodation recesses 32, the first contact part 33 and the second contact part 34. The pair of accommodation recesses 32 is provided for accommodating each set of elastic part 22. Each accommodation recess 32 axially penetrates the first mass part 30 and is opened radially outward.

Each set of elastic part 22, for instance, two coupling coil springs 40 (to be described), is disposed in the pair of accommodation recesses 32. The bottom part of each accommodation recess 32 is configured to be capable of supporting one end of each coupling coil spring 40. For example, the circumferential width of the bottom part of each accommodation recess 32 is substantially the same as that of one end of each set of elastic part 22, for instance, the outer diameter of one end of each coupling coil spring 40.

The opened part of each accommodation recess 32 is configured to make each coupling coil spring 40 deformable in an intersecting direction that intersects with a spring axial direction. For example, the circumferential width of the opened part of each accommodation recess 32 is greater than that of the bottom part of each accommodation recess 32. Due to this configuration, while one end of each coupling coil spring 40 is supported by the bottom part of each accommodation recess 32, the other end of each coupling coil spring 40 is made movable with respect to one end of each coupling coil spring 40 in the aforementioned intersecting direction, for instance, the circumferential direction. In other words, each coupling coil spring 40 is made deformable inside each accommodation recess 32 in the aforementioned intersecting direction, for instance, the circumferential direction.

The first contact part 33 is included in the inner peripheral part of the first mass part 30. The first contact part 33 is capable of making contact with the first contacted part 28 of each inertia placement part 27. The first contact part 33 composes the aforementioned radially inner part of each inertia part 21.

The first contact part 33 includes a pair of first contact surfaces 33a and the positioning protrusion 33b (exemplary second positioning part) composing the positioning structure. Each of the pair of first contact surfaces 33a has a substantially circular-arc shape. The pair of first contact surfaces 33a is provided at an interval in the circumferential direction. The pair of first contact surfaces 33a is capable of making contact with the pair of first contacted surfaces 28a of each inertia placement part 27. When the pair of first contact surfaces 33a is not in contact with the pair of first contacted surfaces 28a, the aforementioned gap is produced between the first contact surfaces 33a and the first contacted surfaces 28a.

The positioning protrusion 33b is provided for positioning each inertia part 21 in the circumferential direction. The positioning protrusion 33b is configured to be capable of being engaged with the positioning recess 28b of each inertia placement part 27 (the first contacted part 28). Specifically, the positioning protrusion 33b is provided circumferentially between the pair of first contact surfaces 33a. In more detail, the positioning protrusion 33b is included in the circumferential middle of the first mass part 30.

The outer surface of the positioning protrusion 33b has a substantially V shape. The outer surface of the positioning protrusion 33b is capable of making contact with the inner surface of the positioning recess 28b of the holder 20. The tip of the positioning protrusion 33b is herein configured to be capable of making contact with part of the inner surface of the positioning recess 28b.

The second contact part 34 is included in the outer peripheral part of the first mass part 30. The second contact part 34 is capable of making contact with the second contacted part 29 of each inertia placement part 27. The second contact part 34 includes a second contact surface 34a. The second contact surface 34a has a substantially circular-arc shape. The second contact surface 34a is capable of making contact with the second contacted surface 29a of the holder 20. When the second contact surface 34a is not in contact with the second contacted surface 29a, the aforementioned gap is produced between the second contact surface 34a and the second contacted surface 29a.

—Second Mass Part—

As shown in FIG. 3, the plural second mass parts 31 are attached to the first mass part 30, and function as an inertia body together with the first mass part 30. As shown in FIGS. 5 to 8, each second mass part 31 includes a pair of cover parts 35, a pair of holder engaging parts 36 and the third contact part 37.

The pair of cover parts 35 is disposed on both axial sides of each accommodation recess 32, and is attached to the first mass part 30. In more detail, the pair of cover parts 35 is attached to the first mass part 30 whereby each accommodation recess 32 is covered from both axial sides. The pair of cover parts 35 is fixed to the first mass part 30 by fixation means such as a plurality of bolts (not shown in the drawings). Accordingly, each coupling coil spring 40, accommodated in each accommodation recess 32, is restricted from axially jumping out.

The pair of holder engaging parts 36 is a pair of parts to be engaged with each coupling part 26. The pair of holder engaging parts 36 is configured to be movable circumferentially and radially with respect to each coupling part 26. Each of the pair of holder engaging parts 36 is provided on each cover part 35.

For example, the pair of holder engaging parts 36 is disposed at a predetermined interval, and each is provided on the outer peripheral part of each cover part 35. The interval between the pair of holder engaging parts 36 is greater than the thickness of each coupling part 26. Each coupling part 26 is disposed axially between the pair of holder engaging parts 36.

Each third contact part 37 is included in the outer peripheral part of each second mass part 31. Each third contact part 37 is capable of making contact with the second contacted part 29 of each inertia placement part 27. The third contact parts 37 and the second contact part 34 of the first mass part 30 compose the aforementioned radial outer part of each inertia part 21.

For example, each third contact part 37 includes a third contact surface 37a. The third contact surface 37a is composed of the outer peripheral surface of each cover part 35 and that of each holder engaging part 36. Specifically, the third contact surface 37a has a substantially circular-arc shape. The circular-arc shape of the third contact surface 37a is formed in continuation with that of the second contact surface 34a. This enables the second contact surface 34a and the third contact surfaces 37a to make contact with the second contacted surface 29a. When each second contact surface 34a and each third contact surface 37a are not in contact with the second contacted surface 29a, the aforementioned gap is produced between the second contacted surface 29a and both of each second contact surface 34a and each third contact surface 37a.

—Elastic Parts—

Each of the plural sets of elastic parts 22 couples the holder 20 and each inertia part 21. Each set of elastic part 22 is configured to be deformable by the radial movement of each inertia part 21 and be deformable by the circumferential movement of each inertia part 21.

Each set of elastic part 22 is composed of at least one coupling coil spring 40. Each set of elastic part 22 is herein composed of two coupling coil springs 40. Each coupling coil spring 40 is configured to be compressible and extensible in a spring axial direction by a centrifugal force. Additionally, each coupling coil spring 40 is configured to be deformable by input vibration in an intersecting direction intersecting with the spring axial direction.

The spring axial direction herein refers to, for instance, a direction that a spring is compressed/extended. The intersecting direction refers to, for instance, a direction that intersects with the spring axial direction on a plane perpendicular to the rotational center O. The intersecting direction encompasses the circumferential direction.

When in a compression state, each coupling coil spring 40 is disposed radially between the holder 20 and each inertia part 21. In more detail, in a neutral state of the dynamic damper device 5, for instance, in a state without application of a centrifugal force to each inertia part 21, each coupling coil spring 40 is disposed radially between the holder 20 and each inertia part 21 such that an imaginary straight line, including the spring axis of each coupling coil spring 40, passes through the rotational center O.

For example, one end of each coupling coil spring 40 is supported by each inertia part 21. The other end of each coupling coil spring 40 is supported by the holder 20. In more detail, one end of each coupling coil spring 40 is supported by the bottom part of each accommodation recess 32 of each inertia part 21. The other end of each coupling coil spring 40 is supported by the holder 20 through a pin member 53, for instance, a bolt member. One end of the pin member 53 is herein fixed to the holder 20, whereas the other end of the pin member 53 is disposed on the inner peripheral side of each coupling coil spring 40.

Each coupling coil spring 40 is thus disposed between the holder 20 and each inertia part 21, and hence, is compressed in the spring axial direction when each inertia part 21 is radially moved with respect to the holder 20. On the other hand, each coupling coil spring 40 deforms in the intersecting direction when each inertia part 21 is circumferentially moved with respect to the holder 20.

Each coupling coil spring 40 is herein a coil spring having inconstant winding intervals. Each coupling coil spring 40 is formed such that winding intervals in the middle part thereof are wider than those in both ends thereof. With this configuration, windings of each coupling coil spring 40 are closely contacted to each other in a stepwise manner in accordance with the magnitude of centrifugal force, for instance, the magnitude of velocity of rotation to be inputted into the holder 20.

Figure 9:
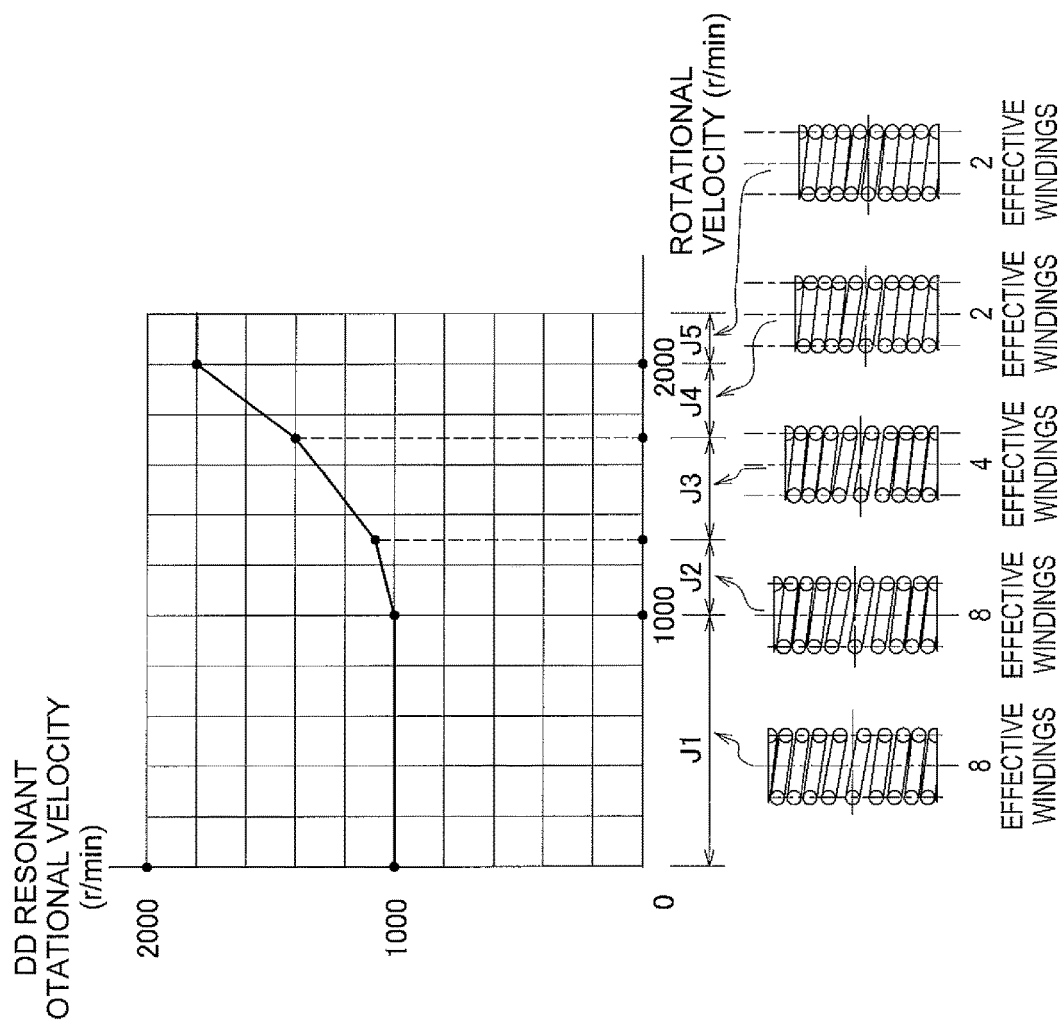
FIG. 9 is a diagram for explaining change in number of effective windings of a coupling coil spring and change in resonant rotational velocity of the dynamic damper device.

Explanation will be herein made by exemplifying a case that the effective number of windings of each coupling coil spring 40 is eight in the neutral state. FIG. 9 exemplifies a case that windings of each coupling coil spring 40 is closely contacted to each other in a stepwise manner in a range of first rotational velocity to fourth rotational velocity.

In this case, the first rotational velocity is, for instance, 1000 r/min, whereas a second rotational velocity is, for instance, 1300 r/min. Additionally, a third rotational velocity is, for instance, 1700 r/min, whereas the fourth rotational velocity is, for instance, 2000 r/min. It should be noted that values herein used for the rotational velocity are exemplary only, and other values may be used instead.

First, when the centrifugal force is greater than or equal to 0 and is less than a first centrifugal force, for instance, when the rotational velocity is greater than 0 and is less than a first rotational velocity (a first state J1), windings of each coupling coil spring 40 are not in close contact with each other. In other words, the number of effective windings of each coupling coil spring 40 is eight. In this state, each coupling coil spring 40 presses each inertia part 21 radially inward, and the first contact part 33 of each inertia part 21 makes contact with the first contacted part 28 of the holder 20 (see FIG. 5).

Next, when the centrifugal force is greater than or equal to the first centrifugal force and is less than a second centrifugal force, for instance, when the rotational velocity is greater than or equal to the first rotational velocity and is less than a second rotational velocity (a second state J2), each coupling coil spring 40, for instance, is compressed and extended without close contact between windings. In this case, the number of effective windings of each coupling coil spring 40 is eight.

Subsequently, when the centrifugal force is greater than or equal to the second centrifugal force and is less than a third centrifugal force, for instance, when the rotational velocity is greater than or equal to the second rotational velocity and is less than a third rotational velocity (a third state J3), each coupling coil spring 40 is compressed and extended, with first and second endmost windings on both ends thereof being in close contact with each other. In this case, the number of effective windings of each coupling coil spring 40 is four.

Finally, when the centrifugal force is greater than or equal to the third centrifugal force and less than a fourth centrifugal force, for instance, when the rotational velocity is greater than or equal to the third rotational velocity and is less than a fourth rotational velocity (a fourth state J4), each coupling coil spring 40 is compressed and extended, with first to third endmost windings on both ends thereof being in close contact with each other. In this case, the number of effective windings of each coupling coil spring 40 is two.

It should be noted that when the centrifugal force reaches the fourth centrifugal force, for instance, when the rotational velocity reaches the fourth rotational velocity (a fifth state J5), the second contact part 34 of each inertia part 21 makes contact with the second contacted part 29 of the holder 20. Accordingly, each inertia part 21 is restricted from moving radially outward, and each coupling coil spring 40 stops being actuated.

As described above, when the number of effective windings of each coupling coil spring 40 changes, a stiffness, contributing to intersecting directional deformation of each coupling coil spring 40, changes in accordance with the change of the number of effective windings of each coupling coil spring 40. Additionally, the stiffness contributing to intersecting directional deformation of each coupling coil spring 40 also changes in accordance with the amount of compression of each coupling coil spring 40.

It should be noted that the stiffness contributing to intersecting directional deformation of each coupling coil spring 40 may be hereinafter referred to as shear stiffness. Additionally, intersecting directional displacement of each coupling coil spring 40 is expressed by the term "shear".

The actuation state of each coupling coil spring 40 is herein solely explained, but the actuation state of each coupling coil spring 40 in the dynamic damper device 5 will be explained in the following "[Action of Dynamic Damper Device]".

[Actions of Torque Converter Body and Lock-up Device]

First, an action of the torque converter body 3 will be explained. In a condition that the front cover 2 and the impeller 6 are rotated, the hydraulic oil flows from the impeller 6 to the turbine 7, and a torque is transmitted from the impeller 6 to the turbine 7 through the hydraulic oil. The torque transmitted to the turbine 7 is transmitted to the input shaft of the transmission through the turbine hub 7c.

When the speed ratio of the torque converter 1 increases and the rotational velocity of the input shaft reaches a predetermined value, the piston 12 is moved toward the front cover 2 by difference between pressures of the hydraulic oil on the axially both sides of the piston 12, and the friction facing 13 is pressed onto the front cover 2 by the pressing part 12a of the piston 12. Accordingly, the clutch part 10 is turned on.

In a clutch-on state described above, the torque is transmitted to the turbine hub 7c through the lock-up device 4. Specifically, the torque inputted into the front cover 2 is transmitted through a path of "the piston 12→the drive plate 14→the plural outer peripheral side coil springs 15 and the plural inner peripheral side coil springs 16→the driven plate 17" in the lock-up device 4, and is outputted to the turbine hub 7c.

The lock-up device 4 in the clutch-on state herein transmits the torque as described above, and also attenuates torsional vibration to be inputted thereto from the front cover 2. Specifically, when torsional vibration occurs in the lock-up device 4, the plural outer peripheral side coil springs 15, disposed in the first and third window parts 14b, 18b and 19b, and the inner peripheral side coil springs 16, disposed in the second and fourth window parts 14c, 18c and 19c, are compressed in parallel between the drive plate 14 and the driven plate 17. Thus, torsional vibration is attenuated by the actuation of the plural outer peripheral side coil springs 15 and inner peripheral side coil springs 16. Specifically, torsional vibration is attenuated by slide between the plural outer peripheral side coil springs 15 and inner peripheral side coil springs 16 and the first to fourth window parts 14b, 14c, 18b, 19b, 18c and 19c.

It should be noted that when the clutch part 10 is turned off, the piston 12 is moved toward the turbine 7 by the difference between pressures of the hydraulic oil on the axially both sides of the piston 12. As a result, pressing the pressing part 12a of the piston 12 onto the front cover 2 is released. Accordingly, the clutch part 10 is turned off.

[Action of Dynamic Damper Device]

<Overview of Action of Dynamic Damper Device>

The torque transmitted to the lock-up device 4 is transmitted through the path explained in [Actions of Torque Converter Body and Lock-up Device], and is transmitted to a transmission-side member through the turbine hub 7c. At this time, torsional vibration (input vibration) to be transmitted from the lock-up device 4 can be effectively inhibited, because the turbine hub 7c is provided with the dynamic damper device 5 as well as the lock-up device 4.

For example, when the input vibration is transmitted to the dynamic damper device 5, the plural inertia parts 21 are moved relatively to the holder 20 through the plural elastic parts 22 in the radial direction and the circumferential direction. For example, while each inertia part 21 is radially moved with respect to the holder 20 by a centrifugal force, phase difference occurs between the holder 20 and each inertia part 21 in the rotational (circumferential) direction by the action of each elastic part 22 in response to the input vibration. The input vibration, for instance, fluctuations in rotational velocity, is absorbed in the dynamic damper device 5 by the occurrence of phase difference.

<Detailed Action of Dynamic Damper Device>

Explanation will be herein made by exemplifying a case that as shown in FIG. 9, the dynamic damper device 5 is actuated in a range from a first rotational velocity (e.g., 1000 r/min) to a fourth rotational velocity (e.g., 2000 r/min). Additionally, explanation will be made by exemplifying a case that the resonant rotational velocity of the dynamic damper device 5 is the first rotational velocity (1000 r/min). It should be noted that values herein used for the rotational velocity are exemplary only, and other values may be used instead.

In the present dynamic damper device 5, first, when the velocity of rotation to be inputted into the dynamic damper device 5 is greater than or equal to 0 and less than the first rotational velocity (e.g., 1000 r/min) (the first state JD, the dynamic damper device 5 is in the state of FIG. 5. In this case, the positioning protrusion 33b of each inertia part 21 is engaged with the positioning recess 28b of the holder 20, whereas the first contact surfaces 33a of each inertia part 21 make contact with the first contacted surfaces 28a of the holder 20. Accordingly, in the first state J1, each inertia part 21 is rotated unitarily with the holder 20. Hence, the dynamic damper device 5 has not been actuated yet.

Figure 6:
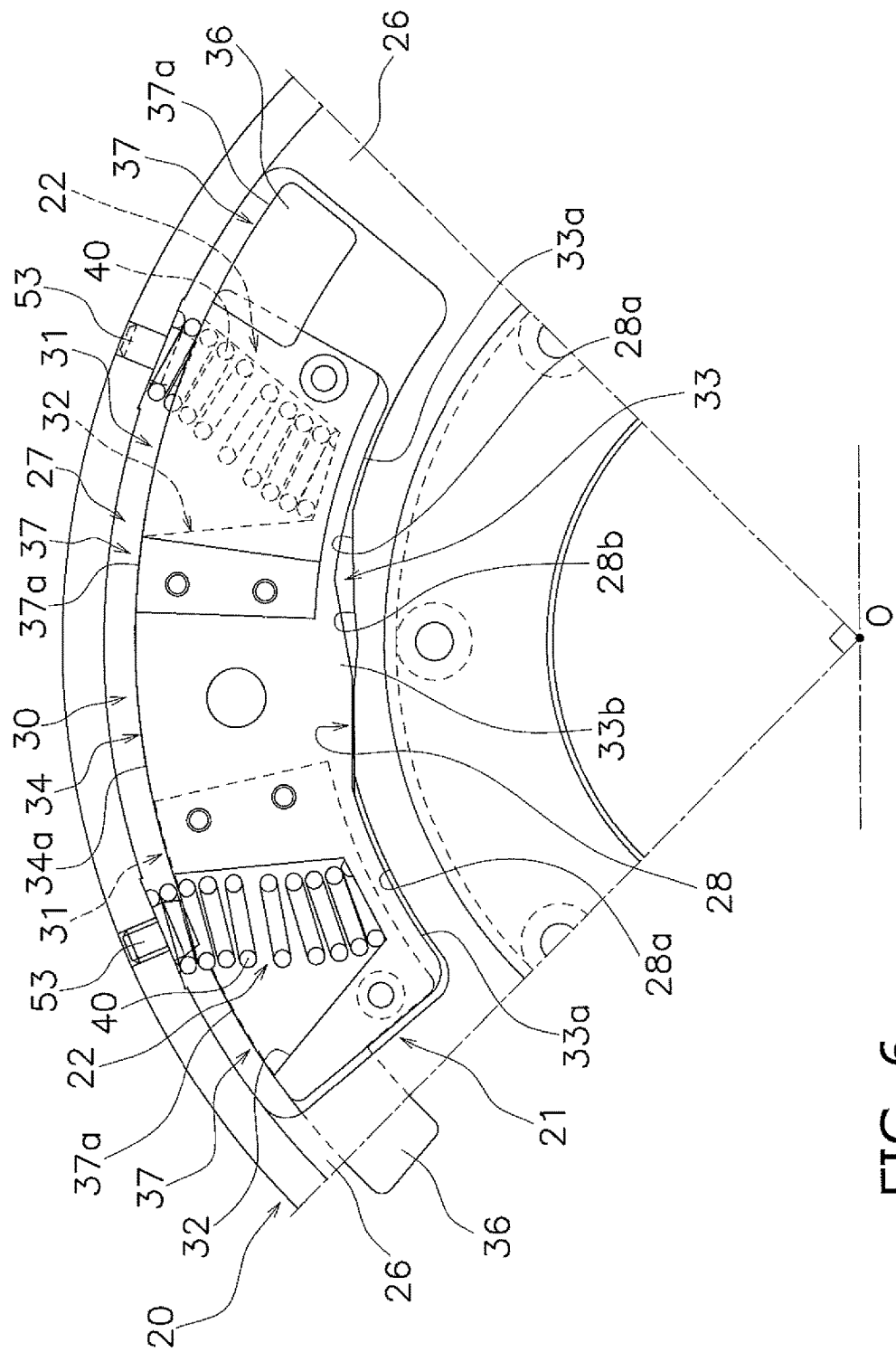
FIG. 6 is a partial side view of the dynamic damper device (a second state)

Next, when the rotational velocity is greater than or equal to the first rotational velocity and is less than the second rotational velocity (e.g., 1300 r/min) (the second state J2), the dynamic damper device 5 is actuated in a state of FIG. 6. In this case, the first contact part 33 (the positioning protrusion 33b and the first contact surfaces 33a) of each inertia part 21 is radially separated from the first contacted part 28 (the positioning recess 28b and the first contacted surfaces 28a) of the holder 20 by a centrifugal force. Accordingly, each set of elastic part 22 (two coupling coil springs 40) is compressed between the holder 20 and each inertia part 21, while a gap is produced between the second and third contact parts 34 and 37 of each inertia part 21 and the second contacted part 29 of the holder 20.

When each coupling coil spring 40 is herein compressed, the shear stiffness of each coupling coil spring 40 changes in accordance with change in compression amount of each coupling coil spring 40. The resonant rotational velocity of the dynamic damper device 5 changes due to change in shear stiffness. For example, as shown in FIG. 9, the shear stiffness of each coupling coil spring 40, in other words, the resonant rotational velocity of the dynamic damper device 5, increases in accordance with increase in compression amount of each coupling coil spring 40.

In the second state J2, each inertia part 21 is circumferentially moved with respect to the holder 20 through each set of elastic part 22 (two coupling coil springs 40). Accordingly, the input vibration, for instance, fluctuations in rotational velocity, is absorbed in the dynamic damper device 5.

In this case, each inertia part 21 is circumferentially moved with respect to the holder 20, while the positioning protrusion 33b of each inertia part 21 is disposed inside the positioning recess 28b of the holder 20. Therefore, when the torsional angle between each inertia part 21 and the holder 20 reaches a predetermined torsional angle of, for instance, 5 degrees, the tip of the positioning protrusion 33b of each inertia part 21 makes contact with a wall part of the positioning recess 28b of the holder 20.

Thus, in the second state J2, the positioning protrusion 33b of each inertia part 21 and the positioning recess 28b of the holder 20 function as a stopper as well. In other words, in the second state J2, each inertia part 21 is circumferentially moved with respect to the holder 20 in a predetermined torsion angular range (e.g., a range of greater than −5 degrees and less than +5 degrees) with reference to the neutral state.

Figure 7:
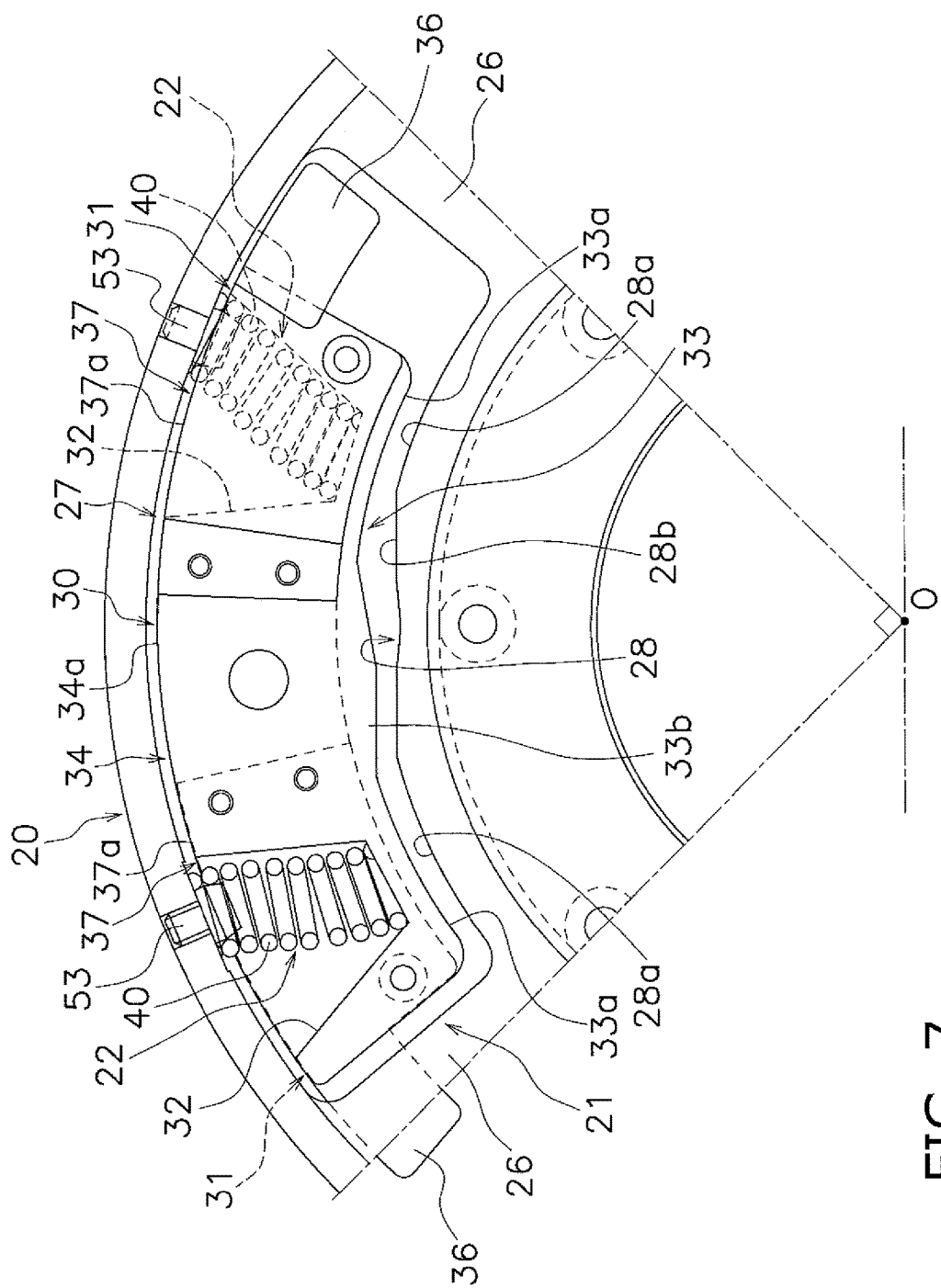
FIG. 7 is a partial side view of the dynamic damper device (third and fourth states)

Subsequently, when the rotational velocity is greater than or equal to the second rotational velocity and less than the third rotational velocity (e.g., 1700 r/min) (the third state J3), the dynamic damper device 5 is actuated in a state of FIG. 7. In this case, the first contact part 33 (the positioning protrusion 33b and the first contact surfaces 33a) of each inertia part 21 is further separated radially from the first contacted part 28 (the positioning recess 28b and the first contacted surfaces 28a) of the holder 20 by the centrifugal force.

Accordingly, each set of elastic part 22 (two coupling coil springs 40) is further compressed between the holder 20 and each inertia part 21, while a gap is produced between the second and third contact parts 34 and 37 of each inertia part 21 and the second contacted part 29 of the holder 20.

Accordingly, as shown in FIG. 9, windings of each coupling coil spring 40 are in close contact with each other, and the number of effective windings of each coupling coil spring 40 changes, for instance, from eight to four. Thus, the shear stiffness of each coupling coil spring 40 changes due to change in number of effective windings of each coupling coil spring 40. Additionally, the shear stiffness of each coupling coil spring 40 changes in accordance with the amount of compression of each coupling coil spring 40 as well. The resonant rotational velocity of the dynamic damper device 5 changes due to these changes in shear stiffness.

For example, when the number of effective windings of each coupling coil spring 40 reduces, the shear stiffness of each coupling coil spring 40 increases. Additionally, when the amount of compression of each coupling coil spring 40 increases, the shear stiffness of each coupling coil spring 40 further increases. Thus, the resonant rotational velocity of the dynamic damper device 5 further increases with increase in shear stiffness of each coupling coil spring 40.

Also in the third state J3, each inertia part 21 is circumferentially moved with respect to the holder 20 through each set of elastic part 22 (two coupling coil springs 40). Accordingly, the input vibration, for instance, fluctuations in rotational velocity, is absorbed in the dynamic damper device 5.

Subsequently, when the rotational velocity is greater than or equal to the third rotational velocity and less than the fourth rotational velocity (e.g., 2000 r/min) (the fourth state J4), the dynamic damper device 5 is actuated in the state of FIG. 7. It should be noted that excluding the number of effective windings of each coupling coil spring 40, the actuation state in the fourth state J4 is substantially the same as that in the third state J3, and hence, will be explained with FIG. 7.

In this case, the first contact part 33 (the positioning protrusion 33b and the first contact surfaces 33a) of each inertia part 21 is further separated radially from the first contacted part 28 (the positioning recess 28b and the first contacted surfaces 28a) of the holder 20 by the centrifugal force.

Accordingly, each set of elastic part 22 (two coupling coil springs 40) is further compressed between the holder 20 and each inertia part 21, while a gap is produced between the second and third contact parts 34 and 37 of each inertia part 21 and the second contacted part 29 of the holder 20.

Accordingly, as shown in FIG. 9, windings of each coupling coil spring 40 are in close contact with each other, and the number of effective windings of each coupling coil spring 40 changes, for instance, from four to two. Thus, the shear stiffness of each coupling coil spring 40 changes due to change in number of effective windings of each coupling coil spring 40. Additionally, the shear stiffness of each coupling coil spring 40 changes in accordance with the amount of compression of each coupling coil spring 40 as well. The resonant rotational velocity of the dynamic damper device 5 changes due to these changes in shear stiffness.

For example, when the number of effective windings of each coupling coil spring 40 reduces, the shear stiffness of each coupling coil spring 40 increases. Additionally, when the amount of compression of each coupling coil spring 40 increases, the shear stiffness of each coupling coil spring 40 further increases. Thus, the resonant rotational velocity of the dynamic damper device 5 further increases with increase in shear stiffness of each coupling coil spring 40.

Also in the fourth state J4, each inertia part 21 is circumferentially moved with respect to the holder 20 through each set of elastic part 22 (two coupling coil springs 40). Accordingly, the input vibration, for instance, fluctuations in rotational velocity, is absorbed in the dynamic damper device 5.

Figure 8:
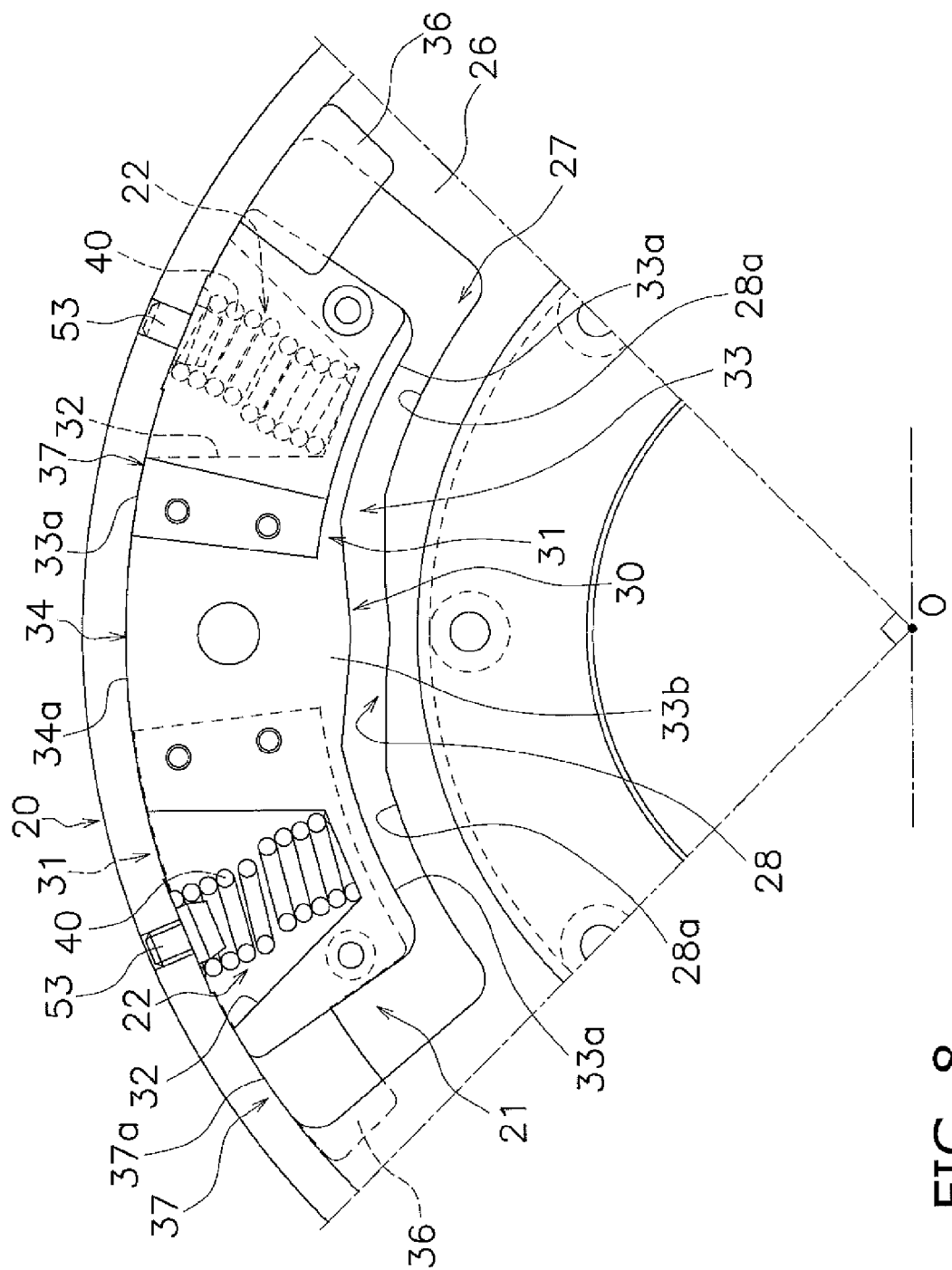
FIG. 8 is a partial side view of the dynamic damper device (a fifth state)

Finally, when the rotational velocity reaches the fourth rotational velocity (e.g., 2000 r/min) (the fifth state J5), the dynamic damper device 5 is in a state of FIG. 8. In this case, the second and third contact parts 34 and 37 of each inertia part 21 make contact with the second contacted part 29 of the holder 20. Accordingly, each inertia part 21 becomes circumferentially immovable. For example, when the second and third contact parts 34 and 37 of each inertia part 21 make contact with the second contacted part 29 of the holder 20, each inertia part 21 becomes circumferentially immovable with respect to the holder 20 by friction resistance generated between each inertia part 21 and the holder 20. In other words, in the fifth state J5, the dynamic damper device 5 stops being actuated.

As described above, in the second to fourth states J2 to J4, the shear stiffness of each coupling coil spring 40 changes in accordance with the compression state (the number of effective windings and the amount of compression) of each coupling coil spring 40. Then, as shown in FIG. 9, the resonant rotational velocity of the dynamic damper device 5 changes with change in shear stiffness of each coupling coil spring 40. In this state, each inertia part 21 is circumferentially moved with respect to the holder 20 through each set of elastic part 22 (two coupling coil springs 40).

[Wrap-up]

(1) The present dynamic damper device 5 is provided for absorbing torsional vibration. The present dynamic damper device 5 includes the holder 20, the inertia part 21 and the elastic part 22. The holder 20 is a part to which the torsional vibration is transmitted. The holder 20 is configured to be rotatable about the rotational center O. The inertia part 21 is provided on the holder 20 so as to be movable in the radial direction with respect to the holder 20 by a centrifugal force and be movable in the circumferential direction with respect to the holder 20 by the torsional vibration. The elastic part 22 couples the holder 20 and the inertia part 21.

In the present dynamic damper device 5, when a centrifugal force acts on the inertia part 21 while the elastic part 22 couples the inertia part 21 and the holder 20, the inertia part 21 is moved in the radial direction with respect to the holder 20 by this centrifugal force. Then, in the radial position after the movement, the inertia part 21 is moved in the circumferential direction with respect to the holder 20 by the torsional vibration described above. The torsional vibration described above is absorbed by this movement of the inertia part 21.

In the present dynamic damper device 5, when the centrifugal force (e.g. rotational velocity) changes, distance between the inertia part 21 and the rotational center O changes. Accordingly, the effective mass (virtual mass) of the inertia part 21 changes. Then, a resonant rotational velocity changes in accordance with change in effective mass. Thus, in the present dynamic damper device 5, the resonant rotational velocity can be changed in accordance with change in centrifugal force, for instance, change in rotational velocity. In other words, torsional vibration can be absorbed preferably and appropriately in accordance with change in centrifugal force (rotational velocity).

(2) In the present dynamic damper device 5, the inertia part 21 may be engaged with the holder 20 so as to be movable in the radial direction and the circumferential direction. With this configuration, the inertia part 21 can be moved in the radial direction and the circumferential direction without preparing any special component.

(3) In the present dynamic damper device 5, the holder 20 may include the inertia placement part 27. The inertia placement part 27 is provided as a part in which the inertia part 21 is disposed to be movable in the radial direction and the circumferential direction. With this configuration, the inertia part 21 can be moved in the radial direction and the circumferential direction without preparing any special component.

(4) In the present dynamic damper device 5, the inertia placement part 27 of the holder 20 may include the first contacted part 28 and the second contacted part 29. The first contacted part 28 is a part with which the radially inner part (the first contact part 33) of the inertia part 21 makes contact. The second contacted part 28 is a part with which the radially outer part (the second and third contact parts 34 and 37) of the inertia part 21 makes contact.

In this case, for instance, in the first state J1, the radially inner part (the first contact part 33) of the inertia part 21 makes contact with the first contacted part 28 of the holder 20. When a friction force between the inertia part 21 and the first contacted part 28 is herein larger than a circumferential force acting on the inertia part 21, the inertia part 21 is immovable in the circumferential direction.

On the other hand, in the fifth state J5, the radially outer part (the second and third contact parts 34 and 37) of the inertia part 21 makes contact with the second contacted part 29. When a friction force between the inertia part 21 and the second contacted part 29 is herein larger than the circumferential force acting on the inertia part 21, the inertia part 21 is immovable in the circumferential direction.

Accordingly, the inertia part 21 can be circumferentially moved by torsional vibration in a range from the first state J1 to the fifth state J5. Thus, in the present dynamic damper device 5, fluctuations in rotational velocity, in other words, torsional vibration, can be absorbed preferably and appropriately in a predetermined range, for instance, in a range from the second state J2 to the fourth state J4.

(5) The present dynamic damper device 5 may further include the positioning structure. The positioning structure positions the inertia part 21 in the circumferential direction with respect to the holder 20. The positioning structure includes the positioning recess 28b and the positioning protrusion 33b. The positioning recess 28b is included in the first contacted part 28. The positioning protrusion 33b is included in the radially inner part (the first contact part 33) of the inertia part 21, and is engaged with the positioning recess 28b. With this configuration, the inertia part 21 can be stably positioned with respect to the holder 20.

(6) In the present dynamic damper device 5, the elastic part 22 may be deformable by movement of the inertia part 21 in the radial direction, and may be deformable by movement of the inertia part 21 in the circumferential direction.

In this case, when the inertia part 21 is radially moved by the centrifugal force, the elastic part 22 is radially deformed. In accordance with the change in shape of the elastic part 22, the shear stiffness of the elastic part 22 also changes. Accordingly, the resonant rotational velocity of the dynamic damper device 5 changes. In this state, when the inertia part 21 is circumferentially moved through the elastic part 22 with respect to the holder 20, torsional vibration is absorbed.

Thus, in the present dynamic damper device 5, the resonant rotational velocity can be changed in accordance with change in centrifugal force, for instance, change in rotational velocity. In other words, torsional vibration can be absorbed preferably and appropriately in accordance with change in centrifugal force (rotational velocity).

(7) In the present dynamic damper device 5, the elastic part 22 may be the coupling coil spring 40. In this case, one end of the coupling coil spring 40 is supported by the holder 20, and the other end of the coupling coil spring 40 is supported by the inertia part 21.

In this configuration, when the inertia part 21 is radially moved by the centrifugal force, the coupling coil spring 40 is axially compressed and deformed, and the shear stiffness thereof changes. Accordingly, the resonant rotational velocity of the dynamic damper device 5 changes. In this state, when the inertia part 21 is circumferentially moved through the coupling coil spring 40 with respect to the holder 20, torsional vibration is absorbed.

Thus, in the present dynamic damper device 5, the resonant rotational velocity can be changed in accordance with change in centrifugal force, for instance, change in rotational velocity. In other words, torsional vibration can be absorbed preferably and appropriately in accordance with change in centrifugal force (rotational velocity).

(8) In the present dynamic damper device 5, the elastic part 22 may be the coupling coil spring 40 having inconstant winding intervals.

In this case, at least part of intervals between windings of the coupling coil spring 40 is set to be inconstant. Accordingly, the resonant rotational velocity can be changed preferably and appropriately in accordance with change in centrifugal force, for instance, change in rotational velocity.

[Other Preferred Embodiments]

The present disclosure is not limited to the preferred embodiment described above, and a variety of changes or modifications can be made without departing from the scope of the present disclosure.

(a) In the aforementioned preferred embodiment, the exemplified case is that windings of each coupling coil spring 40 are in close contact with each other. However, the shear stiffness of each coupling coil spring 40 may be changed only with change in compression amount of each coupling coil spring 40 without making windings of each coupling coil spring 40 be in close contact with each other. Even with this configuration, the resonant rotational velocity of the dynamic damper device 5 can be changed, whereby each inertia part 21 can be moved preferably and appropriately with respect to the holder 20.

(b) In the present disclosure, the configurations of the clutch part 10 and the damper part 11 of the lock-up device 4 are not limited to those in the aforementioned preferred embodiment, and may be regarded as arbitrary.

(c) In the aforementioned preferred embodiment, the exemplified case is that the dynamic damper device 5 includes four inertia parts 21. However, the number of inertia parts 21 is not limited to that in the aforementioned preferred embodiment, and may be arbitrarily set as long as it is plural.

(d) In the aforementioned preferred embodiment, the exemplified case is that each set of elastic part 22 is composed of two coupling coil springs 40. However, the number of coupling coil springs 40 is not limited to that in the aforementioned preferred embodiment, and may be arbitrarily set as long as it is one or more.

What is claimed is:

1. A dynamic vibration absorbing device for absorbing a torsional vibration, the dynamic vibration absorbing device comprising:
   a rotary part to which the torsional vibration is transmitted, the rotary part rotatable about a rotational center;
   an inertia part provided on the rotary part so as to be movable in a radial direction with respect to the rotary part by a centrifugal force and be movable in a circumferential direction with respect to the rotary part by the torsional vibration;
   a coil spring elastically coupling the rotary part and the inertia part and disposed between the rotary part and the inertia part in a radial direction, such that one end of the coil spring is supported by the rotary part and the other end of the coil spring is supported by the inertia part; and the rotary part includes a placement part comprising a recess in which the inertia part is disposed to be movable in the radial direction and the circumferential direction.

2. The dynamic vibration absorbing device according to claim 1, wherein the inertia part is engaged with the rotary part so as to be movable in the radial direction and the circumferential direction.

3. The dynamic vibration absorbing device according to claim 1, wherein the placement part includes a first contacted part with which a radially inner part of the inertia part makes contact and a second contacted part with which a radially outer part of the inertia part makes contact.

4. The dynamic vibration absorbing device according to claim 3, further comprising:

a positioning structure positioning the inertia part in the circumferential direction with respect to the rotary part, wherein the positioning structure includes a first positioning part and a second positioning part, the first positioning part included in the first contacted part, the second positioning part included in the radially inner part, the second positioning part engaged with the first positioning part.

5. The dynamic vibration absorbing device according to claim 1, wherein the coil spring is deformable by movement of the inertia part in the radial direction, and the coil spring is deformable by movement of the inertia part in the circumferential direction.

6. The dynamic vibration absorbing device according to claim 1, wherein the coil spring has inconstant winding intervals.

* * * * *